United States Patent [19]

Wernimont

[11] Patent Number: 4,949,799
[45] Date of Patent: Aug. 21, 1990

[54] ELECTRONIC WEIGHING STRUCTURE

[76] Inventor: T. August Wernimont, P.O. Box 116, 2801 Cathmar Ave., Burlington, Iowa 52601

[21] Appl. No.: 376,900

[22] Filed: Jul. 5, 1989

Related U.S. Application Data

[63] Continuation-in-part of Ser. No. 825,456, Feb. 3, 1986, abandoned.

[51] Int. Cl.⁵ .......................... G01G 3/14; G01L 1/22
[52] U.S. Cl. ........................................ 177/211; 177/1; 73/862.65
[58] Field of Search .................. 177/211, 1; 73/862.65

[56] References Cited

U.S. PATENT DOCUMENTS

| | | | |
|---|---|---|---|
| 2,499,033 | 2/1950 | Oberholtzer | 73/862.65 |
| 3,935,914 | 2/1976 | Nordstrom et al. | 177/211 X |
| 4,223,752 | 9/1980 | Belcher | 177/211 |
| 4,261,429 | 4/1981 | Lockery | 177/211 |
| 4,411,159 | 10/1983 | Spear et al. | 177/211 X |
| 4,506,746 | 3/1985 | Lockery | 177/211 |
| 4,597,460 | 7/1986 | Wernimont | 177/211 |
| 4,600,066 | 7/1986 | Griffen et al. | 177/211 |
| 4,601,356 | 7/1986 | Muccillo, Jr. | 177/211 |
| 4,666,006 | 5/1987 | Wernimont | 177/211 |

OTHER PUBLICATIONS

Rosette Strain Gage Chip, IBM Technical Disclosure Bulletin, Jul. 1985, vol. 28, No. 2, pp. 655-656.

Primary Examiner—George H. Miller, Jr.

[57] ABSTRACT

A method of constructing a three(3) load cell weighing appartus using four(4) strain gages is disclosed. The method is then expanded to show how eight(8) or more load cells could be incorporated into a single weighing platform.

6 Claims, 2 Drawing Sheets

ELECTRONIC WEIGHING STRUCTURE

This is a continuation-in-part of application Ser. No. 825,456, filed Feb. 3, 1986, now abandoned.

This invention relates to weighing scales and more particularly, to those scales using electronic sensing and display techniques.

BACKGROUND OF THE INVENTION

Most electronic scales are constructed in two (2) sections: the base and the weighing platform. The base is typically used to hold the load cells while the weighing platform is used to hold the object being weighed and is supported by the load cells. While this method of constructing scales is successful, it increases the height of platform scales and is costly.

Platform scales are also usually constructed in a rectangular form with a support in each corner. In some scales this support is a load cell where a total of four (4) are used and in others the corner support is a lever that transmits the load to a single load cell. The multiple load cell designs are generally more costly but have the advantage of no moving parts or bearings.

This patent discloses means for constructing load cells for weighing scales utilizing three (3) to eight (8) or more point suspension and also discloses means of combining the weighing platform and load cells into an integral structure thereby reducing the scale height and cost.

TECHNICAL BACKGROUND OF THE INVENTION

Electronic scales using strain gage load cells have been used for many years and their designs are documented in patents such as Ruge's U.S. Pat. No. 2,815,480 and Laimins' U.S. Pat. No. 3,512,595. Wernimont patent (now being issued under Ser. No. 06/703,204) discloses a simplified method of constructing load cells, where a single strain gage is used on a load support beam rather than the conventional four (4) strain gage full bridge circuit. It also discloses a method of changing the output of a load cell by using a variable moment arm.

This patent expands the prior art and discloses additional methods of constructing load cells and weighing scales.

SUMMARY OF THE INVENTION

Figure 1:
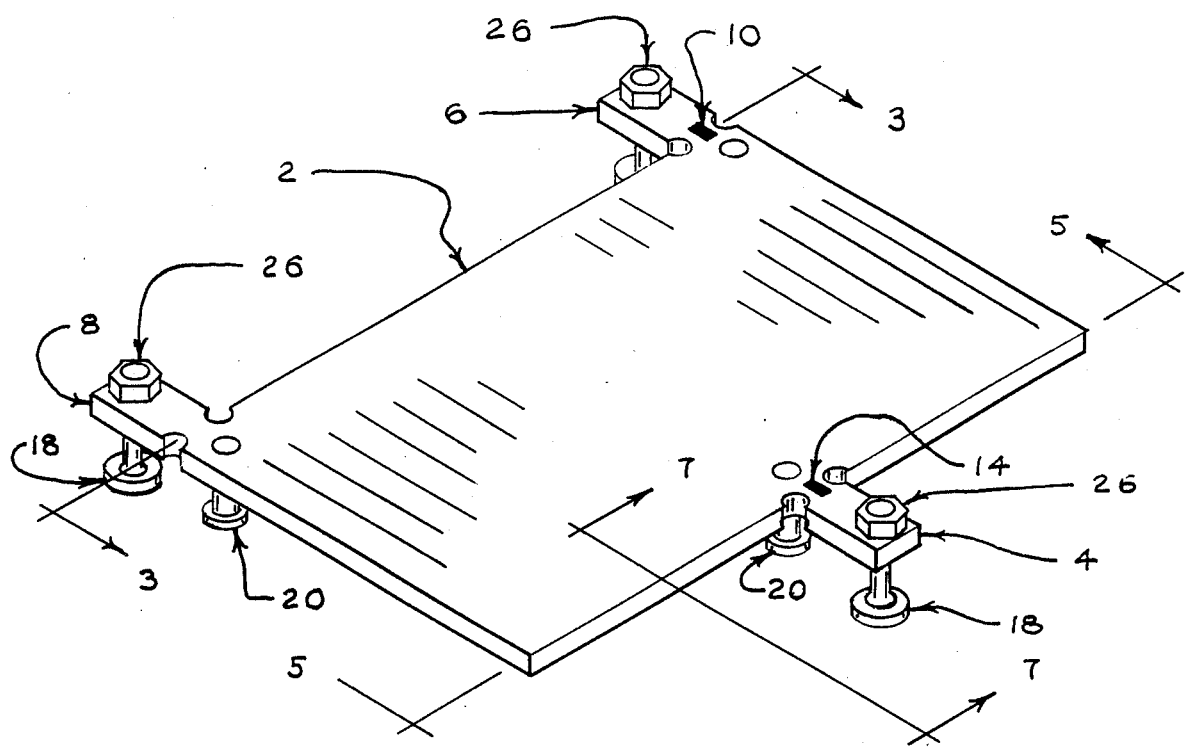
FIG. 1 is an isometric view of a weighing platform that is supported by three (3) load cells that are an integral part of the weighing platform.

This invention discloses a method of constructing a three (3) load cell scale support system utilizing four (4) strain gages where single strain gages are installed on two (2) of the load support beams and two (2) strain gages are installed on the third load support beam. By orientating the two (2) load support beams with the single strain gage so that one (1) experiences tension and the other experiences compression and by further orientating the third load support beam with the two (2) strain gages so that one strain gage experiences tension while the other experiences compression the four (4) strain gages are then interconnected into a bridge circuit that sums the output that is further detected by a meter calibrated to read weight in engineering units.

This three (3) load cell design is incorporated into a scale by cutting a plate from material suitable for load cells into a shape suitable for a weighing platform, so that three (3) support tabs are formed. Strain gages are installed on these support tabs and vertical supports further attached to the end of the tabs. The output from each of these load cells can be adjusted by moving the vertical support inward or outward thereby increasing or decreasing the bending movement on the strain gages.

The support platform with the three (3) integral load cells can be designed as a four (4) load cell version and also the load cells can be cut into the weighing platform rather than projecting from the edge.

Larger platforms can be constructed using multiple load cells distributed across the surface of the weighing structure to more uniformly support the weight placed on it without increasing the structural strength of the plate. Overload protection of the load cells is provided by adjustable stops at each load cell.

The load cells can be constructed using one (1), two (2), or four (4) strain gages and interconnected so that compressive outputs are additive and tensile outputs are additive on the bridge circuit. Matching of the outputs can be achieved by mechanically adjusting the bending moment at the strain gages.

Mechanical matching of the output from the load cells is not necessary if the load cells are constructed of such accuracy and uniformity that their outputs are identical when loaded.

DETAILED DESCRIPTION OF THE INVENTION

While this invention can be embodied in many different forms, there is shown in the drawings and disclosed in detail, a preferred embodiment of the invention. The present disclosure is to be considered as an exemplification of the principle of the invention and is not intended to limit the invention to the embodiment illustrated.

Figure 2:
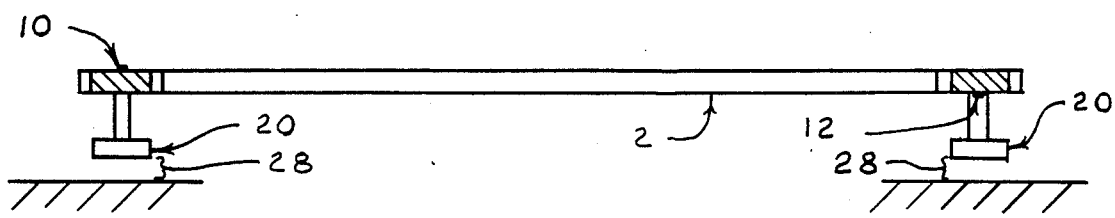
FIG. 2 is a detailed view of the placement of strain gages, on the single gage load cells, partly in section, generally taken along plane 3—3 of FIG. 1.
Figure 3:
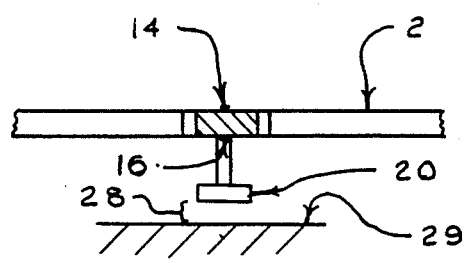
FIG. 3 is a detailed view of the placement of the strain gages, on the two (2) gage load cell, partly in section, generally taken along plane 5—5 of FIG. 1.
Figure 4:
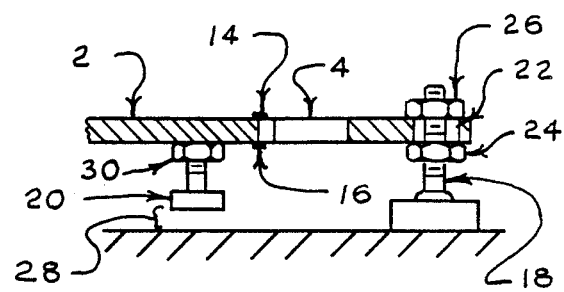
FIG. 4 is a detailed view of the two (2) gage load cell, partly in section, generally taken along plane 7—7 of FIG. 1.

FIG. 1 illustrates weighing platform 2 with three (3) tabs, 4, 6, and 8 projecting from it. Strain gages 10 and 12 are installed on tabs 6 and 8 as shown in FIG. 2 to make them single strain gage load cells. Strain gages 14 and 16 are installed on tab 4 as shown in FIG. 3 and FIG. 4 to make it a two (2) strain gage load cell. Vertical supports 18, which transmit only vertical forces, are attached to the load cells to support the weighing platform. Adjustable stops 20 are used to prevent overload damage to the load cells by closing gap 28 and transmitting the object weight directly to rigid support 29.

Stains gages 10 and 14 are oriented to detect compressive strain when an object is placed on weighing platform 2 while strain gages 12 and 16 are oriented to detect tensile strain. These strain gages are interconnected into a bridge circuit so that the two (2) compression gages and the two (2) tensile gages are in diametrically opposite legs of the bridge circuit. The output of the bridge circuit is connected to a meter that is calibrated to display weight in engineering units.

Matching the output of the load cells is achieved by moving vertical support 18 inwardly or outwardly in slot 22 to decrease or increase the bending moment at the strain gages. With the output of the load cells matched an object weighs the same at all points on the weighing platform. Nuts 24 and 26 are then tightened to hold vertical support 18 securely in position.

Figure 5:
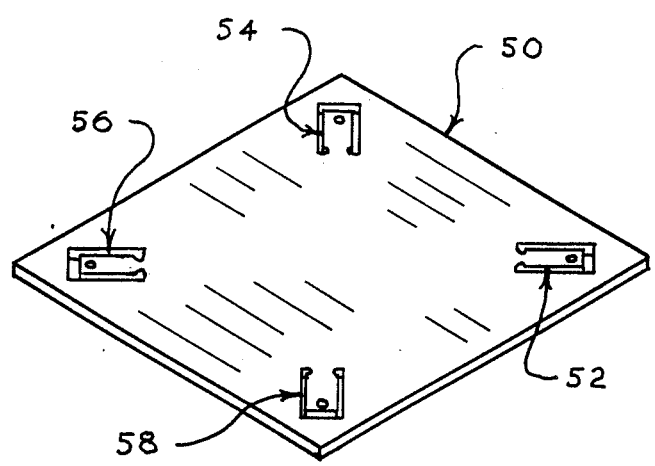
FIG. 5 is an isometric view of a weighing platform that has four (4) load cells as an integral part of the weighing platform.

FIG. 5 illustrates weighing platform 50 with four (4) load cells (52,54,56, & 58) as an integral part of the weighing platform where the load cell tabs are inside the perimeter of the weighing platform. The four (4) strain gages on these tabs are orientated so that two (2) detect tension and two (2) detect compression and they are electronically interconnected to form a bridge circuit with the tensile and compressive strain gages in diametrically opposite legs of the bridge. Matching of the output of the load cells is achieved by varying the bending moment at the strain gages.

Figure 7:
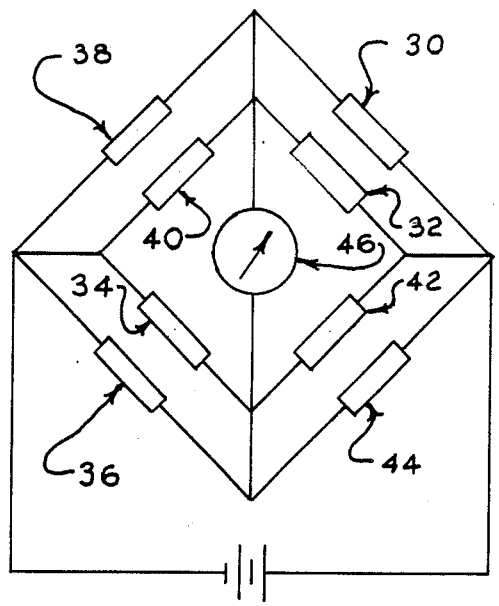
FIG. 7 is an electrical bridge circuit showing the inter-connection of eight (8) single strain gage load cells.
Figure 6:
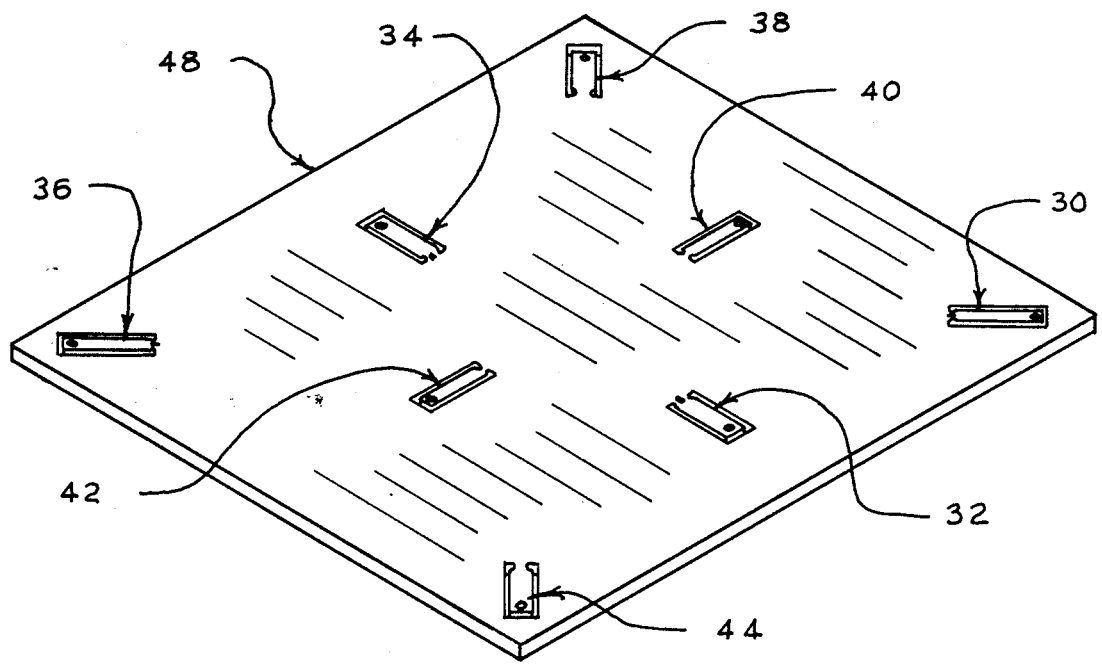
FIG. 6 is an isometric view of a weighing platform that has eight (8) load cells as an integral part of the weighing platform.

FIG. 6 illustrates weighing platform (48) with eight (8) load cells incorporated into the weighing platform. Using multiple load cells placed throughout the surface of the weighing platform reduces the structural strength requirements of the weighing platform. Four (4) of the eight (8) load cells detect tension and four (4) detect compression. They are interconnected as shown in FIG. 7 where strain gages 30, 32, 34, and 36 are compression gages and strain gages 38, 40, 42, and 44 are tension strain gages. Meter 46 detects the signal and is calibrated to read the object weight in engineering units. Matching of the output of the eight (8) load cells is achieved by varying the bending moment at the strain gage.

While the load cells in FIG. 5 and FIG. 6 are disclosed as being constructed with a single strain gage element, they could be constructed as two (2) or four (4) gage load cells and the matching of their output could be achieved by varying the bending moment.

Using load cells that are an integral part of the weighing platform is not an essential feature of this patent. The load cells could be incorporated into castings of different material or be removably attached to the weighing structure.

The utility and appearance of the weighing structure could be improved by covering the lower weighing platform containing the load cells with a solid cover that was esthetically pleasing, if clearance was provided for the load cells to deflect without engaging the solid cover.

I claim:

1. A method of constructing an electrical load sensing device comprising the steps of:
    (a) attaching two (2) strain gages to two (2) independent load carrying members and,
    (b) attaching two (2) additional strain gages to opposite sides of a third independent load carrying member and,
    (c) orientating the strain gage sensing elements on the load carrying members so that two (2) strain gages detect tension and two (2) strain gages detect compression when loaded and,
    (d) attaching the load carrying members to a suitable weighing platform and,
    (e) electronically interconnecting the strain gages in a bridge circuit where the output of the bridge circuit is further connected to a meter suitable to read the object weight in engineering units.

2. A method of constructing an electrical load sensing device as in claim 1 where the third independent load carrying member with two (2) strain gages attached, has essentially twice the stiffness of the two (2) independent load carrying members with the single strain gages attached and all load carrying members have a similar bending moment arm.

3. A method of constructing an electrical load sensing device as in claim 1 where the third independent load carrying member with the two (2) strain gages attached, has similar structural stiffness as the two (2) independent load carrying member with the single strain gages attached, but where the bending moment applied to the load carrying member with the two (2) strain gages is essentially one-half of the bending moment carried by the load carrying member with the single strain gages.

4. A method of constructing an electrical load sensing device as in claim 1 where the three (3) independent load carrying members are each affixed with a single strain gage and where they possess similar structural stiffness and are loaded with similar bending moments and where a fourth strain gage is attached to a non-loaded member that does not deflect and where the four (4) strain gages are interconnected into a bridge circuit.

5. A method of constructing an electrical load sensing device as in claim 1, where the three (3) independent load carrying members are each affixed with a single strain gage and where they possess similar structural stiffness and are loaded with similar bending moments and where an electrical resistive element with the same resistance as the three (3) strain gages is interconnected to the three (3) active gages to form a bridge circuit.

6. A weighing structure as in claim 1 comprises of:
    (a) a weighing platform of molded or cast material such as plastic or metal that has suitable structural strength to support the objects to be weighed and to which:
    (b) the strain gages are integrally cast into the weighing platform at the time of casting or molding.

* * * * *